United States Patent
vom Stein

(10) Patent No.: US 7,789,055 B2
(45) Date of Patent: Sep. 7, 2010

(54) CONNECTION BETWEEN AN ELASTOMERIC ELEMENT AND A FURTHER ELEMENT AND METHOD FOR PRODUCING SUCH CONNECTION

(75) Inventor: Hans-Joachim vom Stein, Odenthal (DE)

(73) Assignee: AB SKF, Gothenburg (SE)

( * ) Notice: Subject to any disclaimer, the term of this patent is extended or adjusted under 35 U.S.C. 154(b) by 655 days.

(21) Appl. No.: 11/068,887

(22) Filed: Mar. 2, 2005

(65) Prior Publication Data

US 2005/0193972 A1  Sep. 8, 2005

(30) Foreign Application Priority Data

Mar. 2, 2004  (DE)  ............ 10 2004 010 617

(51) Int. Cl.
*F01M 9/10* (2006.01)
(52) U.S. Cl. ............ 123/90.37; 123/90.38; 123/195 C; 277/591
(58) Field of Classification Search ............ 123/90.37, 123/90.38, 195 C, 193.3, 193.5, 90.33, 90.39, 123/196 M, 198 E, 198 F; 277/591, 593, 277/596, 651
See application file for complete search history.

(56) References Cited

U.S. PATENT DOCUMENTS

| | | | |
|---|---|---|---|
| 3,195,360 A * | 7/1965 | Burnett | 74/18.2 |
| 3,396,712 A * | 8/1968 | Sakraida et al. | 123/198 E |
| 4,121,845 A * | 10/1978 | Reynolds et al. | 277/634 |
| 4,447,172 A * | 5/1984 | Galbreath | 404/68 |
| 4,709,670 A | 12/1987 | Ampferer | |
| 5,368,797 A | 11/1994 | Quentin et al. | |
| 5,458,344 A * | 10/1995 | Weiler et al. | 277/634 |
| 5,516,123 A * | 5/1996 | Eckel | 277/637 |
| 5,536,018 A * | 7/1996 | Szott | 277/313 |
| 5,957,100 A * | 9/1999 | Frohwerk et al. | 123/90.38 |
| 6,691,667 B2 * | 2/2004 | Salameh | 123/195 C |
| 6,766,845 B2 * | 7/2004 | Rejc | 160/133 |
| 7,055,829 B2 * | 6/2006 | Russell | 277/585 |
| 2002/0170775 A1 | 11/2002 | Vom Stein et al. | |

FOREIGN PATENT DOCUMENTS

| | | |
|---|---|---|
| DE | 42 21 760 C2 | 6/1993 |
| DE | 42 02 860 A1 | 8/1993 |
| DE | 42 02 860 | 8/1995 |
| DE | 42 21 760 | 7/1996 |
| DE | 101 19 892 A1 | 11/2002 |
| DE | 101 19 892 C2 | 11/2002 |
| EP | 0 554 554 | 8/1993 |
| GB | 2328990 A * | 3/1999 |
| WO | WO 02/057611 A1 | 7/2002 |

OTHER PUBLICATIONS

Two German Official Actions and English Translations of Noted Relevant Portions of Each Official Action.

* cited by examiner

*Primary Examiner*—Ching Chang
(74) *Attorney, Agent, or Firm*—Buchanan Ingersoll & Rooney PC

(57) ABSTRACT

A connection between an elastomer part and a component involves the component, at the connection site to the elastomer part, being provided with a U-shaped groove which has an undercut and which the elastomer part engages positively.

12 Claims, 2 Drawing Sheets

CONNECTION BETWEEN AN ELASTOMERIC ELEMENT AND A FURTHER ELEMENT AND METHOD FOR PRODUCING SUCH CONNECTION

This application is based on and claims priority under 35 U.S.C. §119 with respect to German Application No. 10 2004 010 617.7 filed on Mar. 2, 2004, the entire content of which is incorporated herein by reference.

FIELD OF THE INVENTION

The invention generally relates to a sealing arrangement. More particularly, the invention pertains to a connection between an elastomer part and a component in a sealing arrangement, and a process for producing the connection.

BACKGROUND DISCUSSION

DE 101 19 892 C2 discloses a cylinder head cover of an internal combustion engine which includes an elastomer part connected to a plastic cover-like part.

SUMMARY

A process for producing a connection between an elastomer part and a component involves pressing the component into a molding tool, wherein the component possesses a U-shaped groove with an opening and one widened area on an outer side of each U-leg located at a side of the opening of the U-shaped groove. The component is pressed into the molding tool to compress the component in the area of the opening of the U-shaped groove generally to a width of the component free of the widened areas. The component is heated at least in the area of the groove to a vicinity of a melting point of the component, and elastomer material forming the elastomer part is injected under pressure into the molding tool.

According to another aspect, a cylinder head cover comprises an elastomer part in which is embedded a stiffening element and a cover part, with the cover part being provided with a groove having an undercut and the elastomer part comprising a transition section. The transition section comprises an end portion positioned in the groove and positively engaging the undercut so that the elastomer part and the cover part are secured together.

In accordance with another aspect, a connection between an elastomer part and a component involves the component at the connection site to the elastomer part being provided with a U-shaped groove which possesses an undercut which is positively engaged by the elastomer part.

BRIEF DESCRIPTION OF THE DRAWING FIGURES

The foregoing and additional features and characteristics associated with the invention will be understood from the following detailed description considered with reference to the accompanying drawing figures in which like elements are designated by like reference numerals.

DETAILED DESCRIPTION

Figure 1:
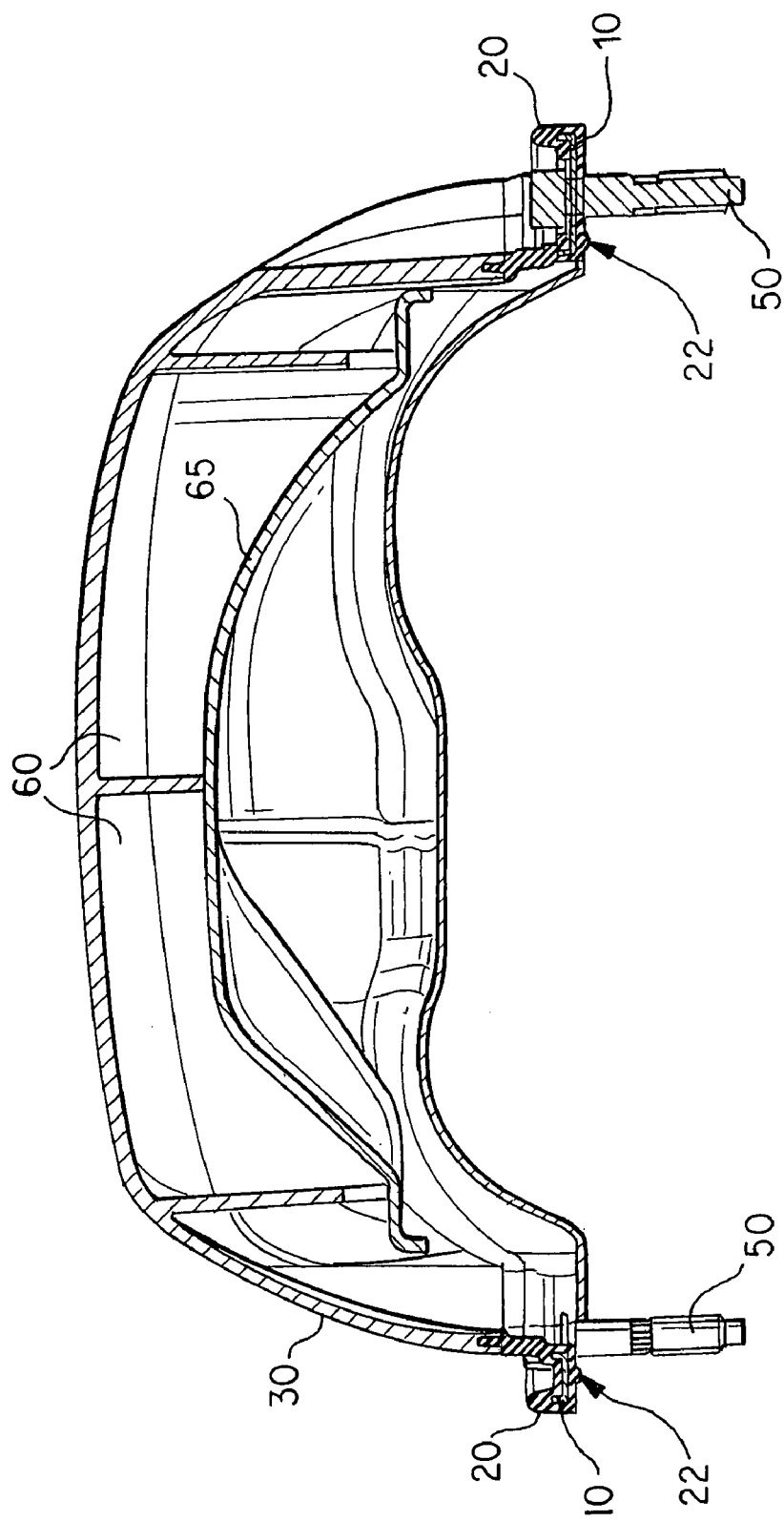
FIG. 1 is a cross-sectional view of a cylinder head cover.

Referring the cross-section shown in FIG. 1, one embodiment of the cylinder head cover comprises an elastomer part 20 which extends or runs peripherally like a frame, with a sealing lip 22, for tightly adjoining the contact surface of an internal combustion engine. A stiffening element 10 is located or embedded within the elastomer part 20, and the stiffening element 10 likewise extends peripherally like a frame. The stiffening element 10 possesses a U-shaped profile and is composed of several sheet metal stampings.

During manufacture, the stiffening element 10 may be coated with an adhesive, with the elastomer part 20 then being molded onto the stiffening element 10 by an injection molding process. The elastomer part 20 may comprise rubber or silicone. The elastomer part 20 and the stiffening element 10 are provided with openings or holes through which the cylinder head cover can be attached to the contact surface via fasteners, particularly screws 50 as shown by way of example in FIG. 1.

The cylinder head cover also comprises a cover-like part 30 which adjoins the elastomer part 20. The cover-like part 30 may be fabricated of plastic material. The elastomer part 20 is connected to the cover-like part 30 by virtue of the elastomer part 20 being molded into a U-shaped groove 32 of the cover-like part 30. As seen in FIG. 1, function spaces 60 for oil separation are provided in the upper area of the cylinder head and are bordered to the bottom by a bottom element 65 of the cylinder head cover.

Figure 2:
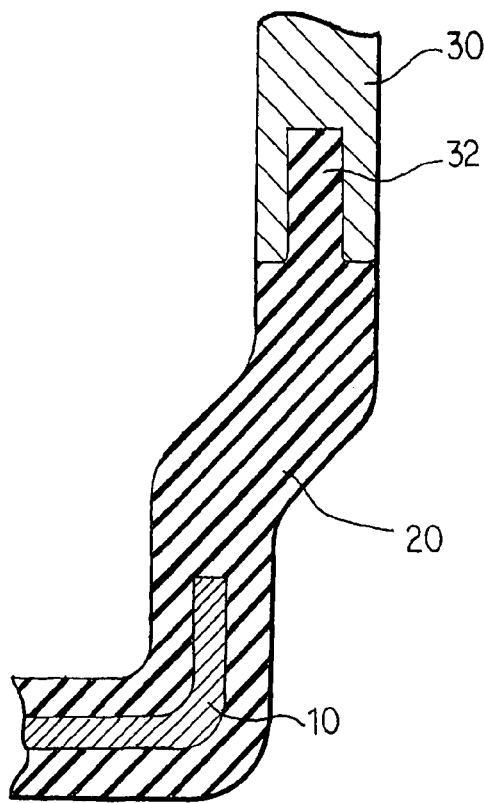
FIG. 2 is an enlarged cross-sectional view of a portion of the cylinder head cover illustrated in FIG. 1, showing the transition area between the elastomer part and the cover-like part of the cylinder head cover.

FIG. 2 shows, on an enlarged scale, a portion of the transition area between the elastomer part 10 toward the cover-like part 20 of FIG. 1. As can be seen, the generally U-shaped groove 32 of the cover-like part 30 is configured to be undercut so that the elastomer part 20 positively engages the groove 32. Thus the groove 32 is configured to be somewhat O-shaped, tapering toward the opening. That is, the groove 32 is configured to possess a somewhat rounded dove-tail shaped configuration in which the size of the groove near the opening is smaller than the portion of the groove farther away from the opening, with the portion of the elastomer part positioned in the groove 32 being similarly configured to achieve the positive engagement. Also, the elastomer part 20 smoothly continues the outer surface of the cover-like part 30 as shown in FIG. 2.

Figure 3:
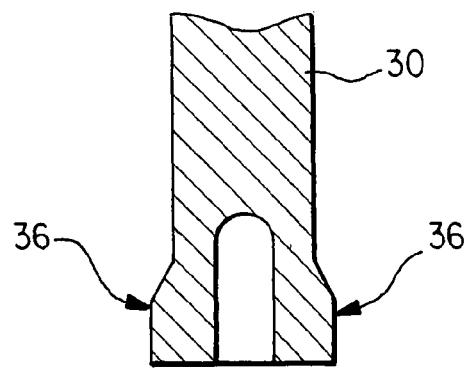
FIG. 3 shows the cover-like part at the beginning of the process during which the cover-like part is connected to the elastomer part.

The aforementioned transition area is produced especially advantageously with a process such as described below. Referring to FIG. 3, the cover-like part 30 is first produced with a U-shaped groove. On either side of the opening of the U-shaped groove, the outer sides of the U-legs each have a respective widened area 36. The cover-like part 30 is pressed, at least in the area of the groove, into a vulcanizing tool. This compresses the cover-like part 30 in the area of the opening of the U-shaped groove roughly to a width that is free of the widened areas 36. Then the cover-like part 30, at least in the area of the groove, is heated to the vicinity of the melting point of the plastic material used (e.g., 190° C.). The groove begins to deform by the widened areas 36 in the direction of the desired O-shaped groove 32 which tapers towards the opening. With subsequent injection of an elastomer mass forming the elastomer part 20 into the vulcanizing tool under a pressure of, for example, 400 bar, the U legs of the cover-like part are pressed with a high pressure against the wall of the vulcanizing tool. Thus, in the indicated transition area, relatively exact flank geometries are achieved and the elastomer mass upon injection is prevented especially advantageously from overflowing in an uncontrolled manner between the U legs on one side and the wall of the vulcanizing tool on the other side.

The connection between the elastomer part and the cover component, and the associated process, for producing the connection, has high connection strength and can be relatively easily produced. Because the elastomer part engages the U-shaped groove of the component, and the groove has an undercut, an especially strong connection between the elastomer part and the component can be achieved.

The principles, preferred embodiment and mode of operation have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A connection between an elastomer part and a component, the component possessing a U-shaped groove that opens at an opening, the connection formed by: positioning the component in a molding tool to compress the component in the area of the opening of the groove so that the groove possesses an undercut configuration; heating the component at least in an area of the groove to a vicinity of a melting point of the component; and injection molding elastomer material into the groove of the component positioned in the molding tool, the elastomer material forming the elastomer part,
    wherein the component is made of a plastic material, the U-shaped groove possesses the undercut as viewed into the opening of the U-shaped groove so that a portion of the U-shaped groove closer to the opening is smaller in dimension than a portion of the groove farther from said opening, a portion of the elastomer part filling the U-shaped groove in the plastic component so that the elastomer part is positively engaged in the undercut of the U-shaped groove, the elastomer part comprising the injection molded elastomer material which is connected with the plastic component, and the plastic component comprising a deformed structure at least in the area of the opening, the deformed structure having been pressed in the direction of the groove which tapers towards the opening and having been deformed by the heating of the plastic material of the component to about the melting point of the plastic material.

2. The connection according to claim 1, wherein the groove is O-shaped tapering toward the opening open end.

3. The connection according to claim 1, wherein the elastomer part is made such that an outer surface of the elastomer part is a smooth continuation of the surface of the component.

4. The connection according to claim 1, wherein the elastomer part is made as a seal device.

5. The connection according to claim 1, wherein the component is made of plastic.

6. The connection according to claim 1, wherein the elastomer part and the component form a part of a cylinder head cover of an internal combustion engine.

7. The connection according to claim 1, wherein the elastomer part is provided with a plurality of through holes to receive respective fasteners.

8. A connection between an elastomer part and a component, the connection comprising the elastomer part and the component, wherein:
    the elastomer part comprises a stiffening element;
    the elastomer part extends in a region between the stiffening element and the component;
    the component possesses a groove with an undercut in a connection region in which the component is connected with the elastomer part, such that the elastomer part engages in the groove to fit the form of the groove and is retained by the undercut; and
    the elastomer part is connected with the component by injection molding the elastomer into the groove in which the region of the groove of the component is heated to a vicinity of the melting point of the material of the component.

9. The connection according to claim 8, wherein the elastomer part is provided with a plurality of through holes to receive respective fasteners, and the through holes also pass the though the stiffening element.

10. The connection according to claim 9, wherein the stiffening element possesses a U-shaped cross-section.

11. The connection according to claim 9, wherein a portion of the elastomer part positioned exteriorly of the groove possesses an outer surface that is a smooth continuation of the outer surface of the component.

12. The connection according to claim 7, wherein a portion of the elastomer part positioned exteriorly of the groove possesses an outer surface that is a smooth continuation of the outer surfae of the component.

* * * * *